US011050209B2

(12) United States Patent
Varnham

(10) Patent No.: US 11,050,209 B2
(45) Date of Patent: Jun. 29, 2021

(54) APPARATUS AND METHOD FOR OPTICAL ISOLATION

(71) Applicant: SPI Lasers UK Limited, Hedge End (GB)

(72) Inventor: Malcolm Paul Varnham, Alresford (GB)

(73) Assignee: SPI Lasers UK Limited, Hedge End (GB)

( * ) Notice: Subject to any disclaimer, the term of this patent is extended or adjusted under 35 U.S.C. 154(b) by 71 days.

(21) Appl. No.: 16/480,779

(22) PCT Filed: Jan. 26, 2018

(86) PCT No.: PCT/GB2018/000015
§ 371 (c)(1),
(2) Date: Jul. 25, 2019

(87) PCT Pub. No.: WO2018/138473
PCT Pub. Date: Aug. 2, 2018

(65) Prior Publication Data
US 2021/0135420 A1  May 6, 2021

(30) Foreign Application Priority Data
Jan. 30, 2017  (GB) ..................... 1701506

(51) Int. Cl.
*G02B 6/14* (2006.01)
*G02B 6/42* (2006.01)
(Continued)

(52) U.S. Cl.
CPC ........ *H01S 3/0064* (2013.01); *G02B 6/02095* (2013.01); *G02B 6/14* (2013.01); *G02B 6/4209* (2013.01)

(58) Field of Classification Search
CPC .... G02B 6/02095; G02B 6/14; G02B 6/4209; H01S 3/0064
See application file for complete search history.

(56) References Cited

U.S. PATENT DOCUMENTS 6,275,628 B1   8/2001 Jones et al.
10,931,075 B2 * 2/2021 Durkin .................. H01S 3/302
(Continued)

FOREIGN PATENT DOCUMENTS

CN    102830464 A    12/2012

OTHER PUBLICATIONS

Bilodeau, F. et al., "Efficient, Narrowband LP01 LP02 Mode Convertors Fabricated in Photosensitive Fibre: Spectral Response", Electronics Letters, EE Stevenage, GB, 27, No. 8, Apr. 11, 1991, pp. 682-684.

*Primary Examiner* — Sung H Pak
(74) *Attorney, Agent, or Firm* — Iandiorio Teska & Coleman, LLP

(57) ABSTRACT

Apparatus for optically isolating a laser (1) from external reflections, which apparatus comprises a mode filter (19) and a first optical fibre (1), wherein: the first optical fibre (1) is a multimode optical fibre that supports a fundamental mode (3) and at least one higher order mode (4); the mode filter (19) is defined by an optical attenuation which is higher for the higher order mode (4) than for the fundamental mode (3); the mode filter (19) is configured to pass the fundamental mode (3) into the first optical fibre (1); and the apparatus being characterized in that: the first optical fibre (1) comprises a long period grating (10); and the long period grating (10) is defined by a period (13) selected to couple the fundamental mode (3) to the higher order mode (4) of the first optical fibre (1); whereby if the fundamental mode (3) and the higher order mode (4) are reflected back into the first optical fibre (1) as back-reflected fundamental and higher (Continued)

order modes (25), (26), then the mode filter (19) optically attenuates the back-reflected higher order mode (26) more than the back-reflected fundamental mode (25) thereby isolating the external reflection.

16 Claims, 3 Drawing Sheets

(51) Int. Cl.
     *H01S 3/00*          (2006.01)
     *G02B 6/02*          (2006.01)

(56) References Cited

U.S. PATENT DOCUMENTS

| | | |
|---|---|---|
| 2002/0051606 A1 | 5/2002 | Takushima et al. |
| 2011/0235165 A1* | 9/2011 | Sugimoto ......... H01S 3/094007 359/341.3 |
| 2012/0229910 A1* | 9/2012 | Durkin ............... G02B 19/0014 359/641 |
| 2014/0238080 A1 | 8/2014 | Gruner-Nielsen et al. |
| 2017/0017036 A1 | 1/2017 | Botheroyd |

* cited by examiner

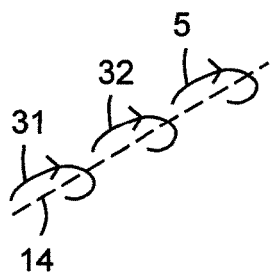
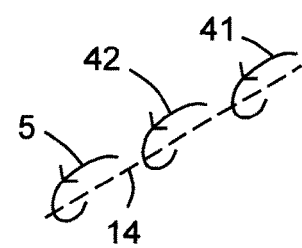
FIG 3
FIG 4
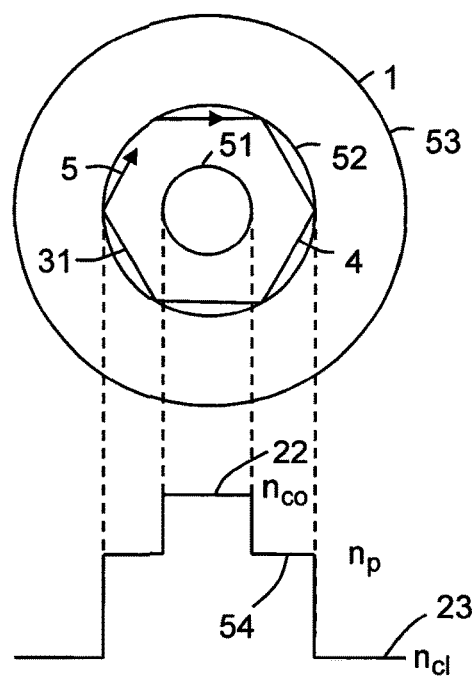
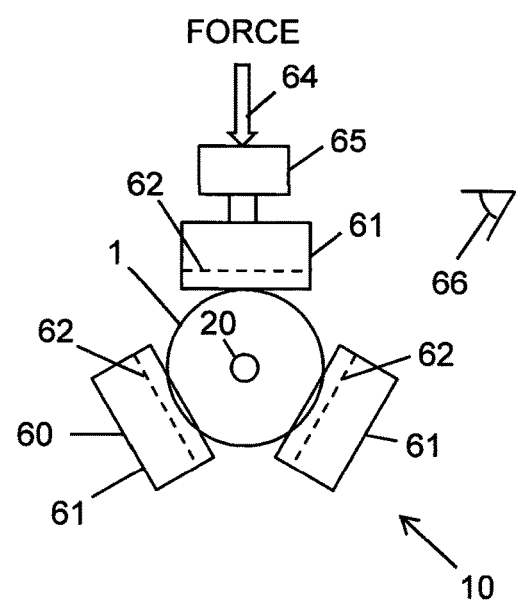
FIG 5
FIG 6

APPARATUS AND METHOD FOR OPTICAL ISOLATION

FIELD OF INVENTION

This invention relates to an apparatus and method for optical isolation. The invention has particular application for optical fibre lasers, laser beam delivery in optical fibre lasers, and equipment for laser processing of industrial materials.

BACKGROUND TO THE INVENTION

There are many applications for lasers that require the output beam of a laser to be optically isolated to prevent back reflections damaging the laser or causing undesirable optical interactions. Examples include welding, cutting, drilling, cladding, brazing, marking, engraving, and slicing materials, especially highly reflective materials such as copper, brass, gold, silver and diamonds. The optical isolation is typically performed using an optical isolator through which the output beam of the laser is coupled. Back reflected light is then prevented from returning to the laser by the optical isolator.

Conventional optical isolators are based on Faraday rotation in crystals through which a strong magnetic field is applied. As the average power of the laser system increases above approximately 1W, the size of the optical isolator generally increases because of the need to avoid laser induced damage at optical surfaces of the crystals within the isolator. The increase in size requires larger and more expensive crystals and magnets. If size, cost of an individual isolator, and isolation performance are not critical, then the light beam can still be collimated through the optical isolator, and expanded with a beam expanding telescope.

However, if cost is an issue (for example in lasers manufactured in high volumes for consumer electronics and marking applications), then isolator crystal size must be kept to a minimum. This leads to a requirement to focus the light beam through the optical isolator in order to optimize the isolation performance. The light beam emerging from the optical isolator is therefore not collimated. A conventional approach would be to provide a collimating lens to collimate the light from the optical isolator to a standard beam diameter which is compatible with standard beam expanding telescopes. A benefit of this approach is that it reduces design effort because standard optics can be used.

The problem of providing a cost effective optical isolator increases as the power of the laser increases. Pulsed lasers, with powers exceeding 10 kW, are used in marking, engraving, cutting, welding, and drilling applications. The average power of pulsed lasers used for typical applications can be 20W, 50W or greater than 100W. Continuous wave lasers with powers exceeding 1 kW are used in cutting and welding applications. In all these applications, reflections from the work piece have to be managed in order to prevent laser radiation being coupled back into the laser and either destabilising the laser output or damaging the laser. In addition, optical isolators for high power lasers can require cooling.

There is a need for an apparatus and a method for optical isolation that reduces or avoids the aforementioned problems.

The Invention

According to a non-limiting embodiment of the invention, there is provided apparatus for optically isolating a laser from external reflections, which apparatus comprises a mode filter and a first optical fibre, wherein:
- the first optical fibre is a multimode optical fibre that supports a fundamental mode and at least one higher order mode;
- the mode filter is defined by an optical attenuation which is higher for the higher order mode than for the fundamental mode;
- the mode filter is configured to pass the fundamental mode into the first optical fibre;

and the apparatus being characterized in that:
- the first optical fibre comprises a long period grating; and
- the long period grating is defined by a period selected to couple the fundamental mode to the higher order mode of the first optical fibre;

whereby if the fundamental mode and the higher order mode are reflected back into the first optical fibre as back-reflected fundamental and higher order modes, then the mode filter optically attenuates the back-reflected higher order mode more than the back-reflected fundamental mode thereby isolating the external reflection.

Advantageously, the apparatus provides optical isolation without the need for expensive crystals and magnets. Moreover, the invention enables an all fibre isolator without requiring optical radiation to be coupled into and out of the isolator with free space optics. The apparatus can be sold with or without the laser.

The long period grating may be a helical long period grating comprising perturbations that describe a helix defined by a screw direction and a period along the axis of the first optical fibre, and the period may be selected such that the higher order mode is a skew mode. The skew mode may be characterized by skew ray propagation along the first optical fibre such that the skew ray propagation has a screw direction which is the same screw direction as the helix. If the skew mode is subsequently reflected back along the first optical fibre, then the screw direction of the reflected skew mode will be opposite to the screw direction of the helix. The reflected skew mode will not be coupled into the fundamental mode of the first optical fibre, and the skew mode will therefore be at least partially rejected by the mode filter.

The long period grating may comprise the first optical fibre and a bending mechanism configured to perturb the first optical fibre into a helix. The bending mechanism may comprise at least one periodic surface. The bending mechanism may be configured to squeeze the periodic surface and a length of the first optical fibre together with a squeezing force whereby the amount of coupling between the fundamental mode and the higher order mode is able to be varied by adjusting the squeezing force. This arrangement provides great control over the mode coupling.

The periodic surface may be chirped. The use of a periodic surface in which the period varies along its length, either monotically or in a non-monotonic fashion, reduces the amount of squeezing force that is required in the bending mechanism to obtain the desired optical isolation. It also broadens the wavelength range over which optical isolation is obtained.

The bending mechanism may comprise at least two of the periodic surfaces arranged at an angle to each other. The periodic surfaces may have the same periodicity. The bending mechanism may be such that each periodic surface is able to be squeezed against the first optical fibre with different squeezing forces. The spatial phases of the periodic surfaces may be configured such that the first optical fibre is deformed substantially in a helical manner when the squeezing forces are applied.

The apparatus may comprise a plurality of the bending mechanisms, which also reduces the required squeezing forces on each of the bending mechanisms thereby improving reliability.

At least one of the bending mechanisms may have a different periodicity than another of the bending mechanisms. Combining bending mechanisms having different periodicities provides greater control of the optical isolation and wavelength band over which the optical isolation can be obtained.

The bending mechanism may include an actuator.

The long period grating may comprise refractive index variations in the core of the first optical fibre. Such refractive index variations can be written using a laser.

The period may be in the range 0.5 mm to 12 mm. Preferably the period may be in the range 1 mm to 10 mm. More preferably, the period is in the range 2 mm to 8 mm.

The mode filter may comprise a long period grating configured to couple the back-reflected higher order mode to at least one cladding mode.

The mode filter may comprise a slanted Bragg grating configured to couple the back-reflected higher order mode to at least one cladding mode.

The mode filter may comprise a second optical fibre in which the higher order mode is not guided by a core of the second optical fibre. The second optical fibre may be a single mode optical fibre.

The mode filter may comprise a cladding mode stripper.

The first optical fibre may be a step index optical fibre.

The first optical fibre may comprise a core and a pedestal. The pedestal may be such that it guides the higher order mode.

The first optical fibre may be characterized by a normalized frequency V-Value of at least 6. The V-value may be at least 10. The V-Value may be at least 15. The V-Value is a measure of how many optical modes can be guided by an optical fibre. An optical fibre is single moded if the V-Value is less than 2.405. The higher the V-Value, the more multi-moded the optical fibre.

The apparatus may comprise the laser, and wherein the laser is coupled to the mode filter. The laser may be defined by a beam quality $M^2$ factor less than 1.6. A fundamental mode having a pure Gaussian beam beam has an $M^2$ value=1. A beam quality $M^2$ value of 1.6 generally describes a laser that emits optical power in a fundamental mode and at least one higher order mode. Preferably, the first optical fibre supports optical modes defined by a beam quality $M^2$ value higher than 1.6.

The laser may be a fibre laser, a disk laser, a rod laser, or a solid state laser. The laser may be a master oscillator power amplifier. The laser may be a nanosecond pulsed fibre laser.

The apparatus may be in the form of an apparatus for the industrial processing of materials.

The invention also provides a method for optically isolating a laser from external reflections, which method comprises:
providing a mode filter and a first optical fibre; and
coupling the mode filter to the first optical fibre;
wherein
the first optical fibre is a multimode optical fibre that supports a fundamental mode and at least one higher order mode;

the mode filter is defined by an optical attenuation which is higher for the higher order mode than for the fundamental mode;
the mode filter is configured to pass the fundamental mode into the first optical fibre;
and the method being characterized in that:
the first optical fibre comprises a long period grating; and
the long period grating is defined by a period selected to couple the fundamental mode to the higher order mode of the first optical fibre;
whereby if the fundamental mode and the higher order mode are reflected back into the first optical fibre as back-reflected fundamental and higher order modes, then the mode filter optically attenuates the back-reflected higher order mode more than the back-reflected fundamental mode thereby isolating the external reflection.

The method of the invention may include a step or steps as required to utilize the above mentioned optional aspects of the apparatus of the invention.

BRIEF DESCRIPTION OF THE DRAWINGS

Embodiments of the invention will now be described solely by way of example and with reference to the accompanying drawings in which:

FIG. 3 shows the skew mode propagating along the fibre axis;

FIG. 4 shows a reflected skew mode propagating along the fibre axis;

FIG. 5 shows an optical fibre having a pedestal;

FIGS. 6 to 9 show long period gratings comprising a bending mechanism that is able to deform the first optical fibre in a helix.

PREFERRED EMBODIMENT

Figure 1:
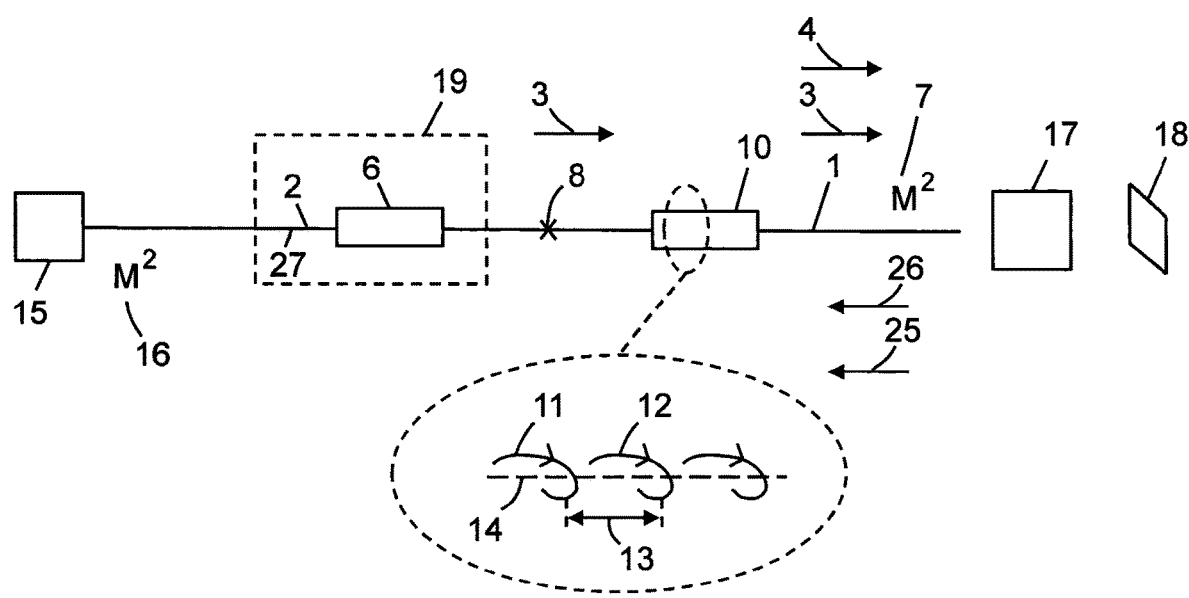
FIG. 1 shows apparatus for optical isolation according to the present invention.
Figure 2:
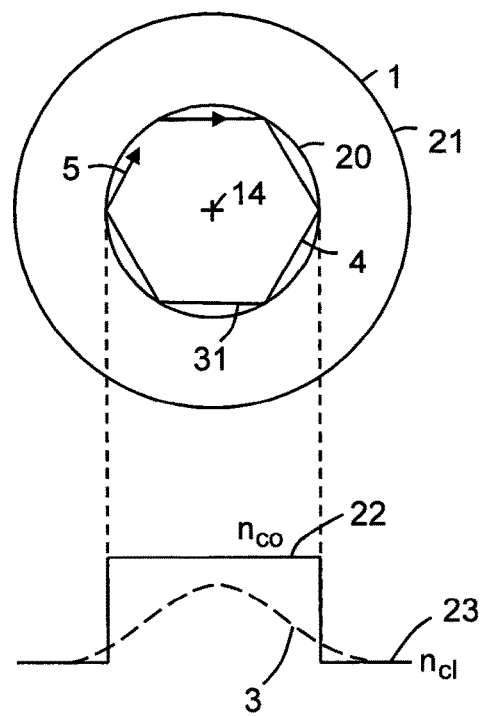
FIG. 2 shows a cross section of a skew mode propagating in the first optical fibre.

FIG. 1 shows apparatus for optically isolating a laser 1 from external reflections, which apparatus comprises a mode filter 19 and a first optical fibre 1, wherein:
the first optical fibre 1 is a multimode optical fibre shown with reference to FIG. 2 that supports a fundamental mode 3 and at least one higher order mode 4;
the mode filter 19 is defined by an optical attenuation which is higher for the higher order mode 4 than for the fundamental mode 3;
the mode filter 19 is configured to pass the fundamental mode 3 into the first optical fibre 1;
and the apparatus being characterized in that:
the first optical fibre 1 comprises a long period grating 10; and
the long period grating 10 is defined by a period 13 selected to couple the fundamental mode 3 to the higher order mode 4 of the first optical fibre 1;
whereby if the fundamental mode 3 and the higher order mode 4 are reflected back into the first optical fibre 1 as back-reflected fundamental and higher order modes 25, 26, then the mode filter 19 optically attenuates the back-reflected higher order mode 26 more than the back-reflected fundamental mode 25 thereby isolating the external reflection.

Advantageously, the apparatus of the invention provides optical isolation without the need for expensive crystals and magnets. Moreover, the invention enables an all fibre isolator without requiring optical radiation to be coupled into and out of the isolator with free space optics. The apparatus can be sold with or without the laser 1.

FIG. 2 shows a cross-section of the first optical fibre 1. The first optical fibre 1 is depicted as a step index fibre having a core 20 and a cladding 21. The core 20 has a refractive index $n_{co}$ 22 which is greater than a refractive index $\eta_{cl}$ 23 of the cladding 21.

The first optical fibre 1 supports the fundamental mode 3 and also the skew mode 31 that is characterized by the skew ray propagation 5 around the axis 14 of the first optical fibre 1 shown with reference to FIG. 3. The skew ray propagation 5 in FIG. 2 is depicted as a projection onto a cross section of the first optical fibre 1. The skew ray propagation 5 has a screw direction 32 that corresponds to a right-handed helix. Optical modes propagating along optical fibres are often described as linearly polarized $LP_{p,q}$ modes, where the "p" is the azimuthal mode number, and the "q" is the radial mode number. The fundamental mode is the $LP_{0,1}$ mode; this has an azimuthal mode number p=0, and a radial mode number q=1. Skew modes have an azimuthal mode number of at least one, and a radial mode number that is at least one.

Referring to FIG. 1, the long period grating 10 is depicted as a helical long period grating comprising perturbations that describe a helix 11 defined by a screw direction 12 and a period 13 along the axis 14 of the first optical fibre 1. The period 13 is selected such that the fundamental mode 3 is coupled into the skew mode 31 shown in FIG. 3 by the helical long period grating. The period 13 is preferably equal to $2\pi/(\beta_1-\beta_2)$ where $\beta_1$ and $\beta_2$ are the propagation constants of the fundamental mode 3 and the skew mode 31.

FIG. 4 shows the resulting skew mode 41 which would occur if the skew mode 31 is reflected back down the first optical fibre 1. The reflected skew mode 41 has a screw direction 42 that corresponds to a left handed helix, that is, it has the opposite hand compared to the skew direction 32 of the skew mode 31 and the skew direction 10 of the long period grating 10. The long period grating 10 will therefore not couple the reflected skew mode 41 into the fundamental mode 3 of the first optical fibre 1. The reflected skew mode 41 will therefore be at least partially rejected by the mode filter 19 which optically attenuates higher order modes 4 including skew modes 41 more than the fundamental mode 3. The mode filter 19 can operate by coupling or scattering the higher order mode 4 from the core 20 into the cladding 21, or by coupling the higher order mode 4 into leaky or radiation modes. The mode filter 19 can comprise a polarizer. The optical attenuation provided by the mode filter 19 can be by absorption or scattering.

Referring again to FIG. 1, the mode filter 19 is shown as comprising a second optical fibre 2. The second optical fibre 2 may be such that it supports less optical modes than the first optical fibre 1. The second optical fibre 2 may be a single mode or a multi mode optical fibre. Preferably, the second optical fibre 2 is a single mode optical fibre. The second optical fibre 2 is coupled to the first optical fibre 1, preferably by a fusion splice 8. The first and the second optical fibres 1, 2 may be such that the coupling between them has a splice loss less than 0.5 dB, preferably less than 0.2 dB, and more preferably less than 0.1 dB. Such a loss will increase the optical isolation provided by the apparatus. The second optical fibre 2 is shown as having a cladding mode stripper 6 for removing optical radiation propagating in its cladding 27. The cladding mode stripper 6 may be cooled. A fundamental mode propagating along the optical fibre 2 will be transmitted by the cladding mode stripper 6 and propagated along the optical fibre 1 as the single transverse mode 3. The single transverse mode 3 will be coupled to the skew mode 31 by the long period grating 10. If the skew mode 31 is reflected back along the optical fibre 1 as the reflected skew mode 41, then it will not be coupled back into the fundamental mode 3 of the optical fibre 1. The reflected skew mode 41 will couple into higher order modes of the optical fibre 2 which propagate in the cladding 27 of the optical fibre 2. These so-called cladding modes will then be stripped by the cladding mode stripper 6. Reflected optical radiation is thus removed from the apparatus by the cladding mode stripper 6, thus providing the required optical radiation. Alternatively or additionally, the mode filter 19 can comprise a long period grating or a blazed fibre Bragg grating. The long period grating or blazed fibre Bragg grating can be configured to pass the fundamental mode 3 and to remove higher order modes 4 including the reflected skew mode 41 by coupling it into cladding modes. The cladding modes can be removed with the cladding mode stripper 6. Such filters can be used advantageously if the second optical fibre 2 is a multimode optical fibre. If a long period grating is used in the mode filter 19, then the period of the long period grating is preferably longer than $2\pi/((\beta_1-\beta_2)$ where $\beta_1$ and $\beta_2$ are the propagation constants of the fundamental mode 3 and the skew mode 41 respectively. This is to ensure that the mode filter 19 does not couple the fundamental mode 3 and the skew mode 31 together.

The first optical fibre 1 may comprise a core 51 and a pedestal 52 surrounded by a cladding 53 as shown in FIG. 5. The pedestal 52 has a refractive index 54 that is greater than the refractive index 23 of the cladding 53, and less than the refractive index 22 of the core 51. The pedestal 52 is such that it guides the skew mode 5. The first optical fibre 1 is preferably azimuthally symmetric.

The first optical fibre 1 may be characterized by a beam quality $M^2$ factor 7 of at least 4, preferably at least 10, and more preferably at least 15. The first optical fibre 1 may be characterized by a normalized frequency V-Value 29 of at least 6. The V-Value 29 may be at least 10. The V-Value 29 may be at least 15.

Figure 7:
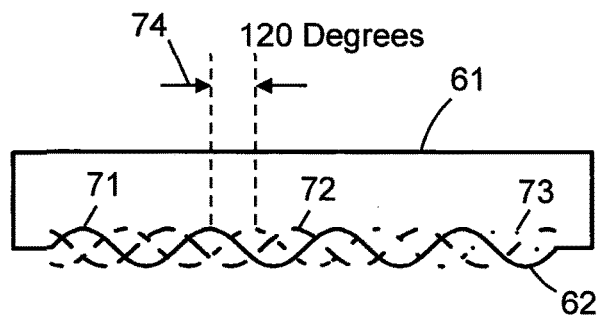

FIG. 6 shows a long period grating 10 which comprises the first optical fibre 1 and a bending mechanism 60. The bending mechanism 60 comprises three jaws 61 at an angle 66 with respect to each other. The angle 66 is shown as 60 degrees. Each of the jaws 61 comprises a periodic surface 62. The periodic surfaces 62 are configured to have a relative phase 74 of 120 degrees with respect to each other, as shown with reference to FIG. 7, in which the phases 71, 72, 73 of the period surfaces 62 are depicted along the length of the long period grating 10. The bending mechanism 60 is thus configured to perturb the first optical fibre 1 into the helix 11.

The bending mechanism 60 is configured to squeeze the periodic surface 62 and the first optical fibre 1 together with a squeezing force 64 whereby the amount of coupling between the fundamental mode 3 and the skew mode 31 is able to be varied by adjusting the squeezing force 64. The bending mechanism 60 may include an actuator 65.

Figure 8:
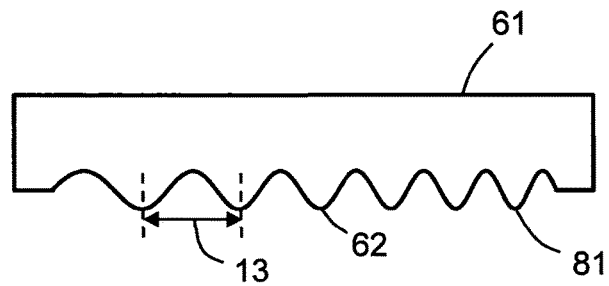

The periodic surfaces 62 may be chirped, as shown by the chirped periodic surface 81 in FIG. 8. The use of the chirped periodic surface 81 in which the period 13 varies along its length, either monotically or in a non-monotonic fashion, reduces the amount of squeezing force 64 that is required to obtain the desired optical isolation. It also broadens the wavelength range over which optical isolation is obtained.

Figure 9:
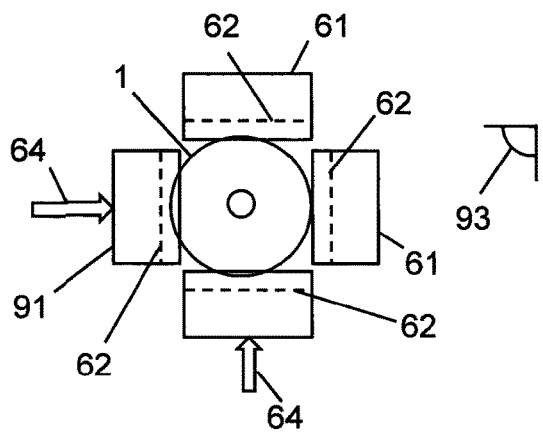

FIG. 9 shows a bending mechanism 91 that comprises two pairs of the periodic surfaces 62 arranged at an angle 93 to each other. The angle 93 is a right angle. The periodic surfaces 62 may have the same period 13. The bending mechanism 91 may be such that each periodic surface 62 is able to be squeezed against the first optical fibre 1 with different squeezing forces 64. As described with reference to FIGS. 6 and 7, the periodic surfaces 62 may be configured such that the first optical fibre 1 is deformed substantially in a helical manner when the squeezing forces 64 are applied to the periodic surfaces 62. This arrangement provides great control over the mode coupling and allows the degree of optical isolation to be adjusted by varying the squeezing force 64.

The apparatus may comprise a plurality of the bending mechanisms 60, which also reduces the required squeezing forces 64 on each of the bending mechanisms 60 thereby improving reliability.

At least one of the bending mechanisms 60 may have a different periodicity 13 than another of the bending mechanisms 60. Combining bending mechanisms having different periodicities provides greater control of the optical isolation and wavelength band over which the optical isolation can be obtained.

Figure 10:
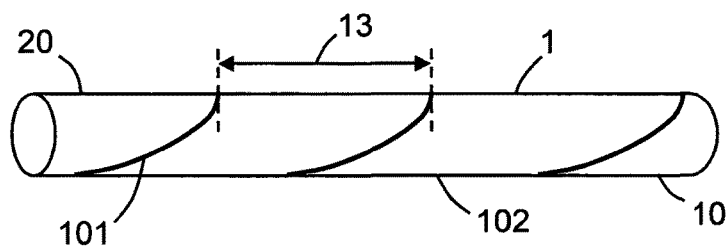
FIG. 10 shows a long period grating comprising refractive index variations in the core of the first optical fibre.

FIG. 10 depicts a long period grating 102 comprising refractive index variations 101 along the core 20 of the first optical fibre 1. Such refractive index variations 101 can be written using a laser and will cause mode coupling between the fundamental mode 3 of the first optical fibre 1 and the skew mode 31.

Referring to FIGS. 1 to 10, the period 13 of the helix 11 may be in the range 0.5 mm to 12 mm. The period 13 may be in the range 1 mm to 10 mm. The period 13 may be in the range 2 mm to 8 mm.

Referring to FIG. 1, the apparatus is shown as comprising a laser 15. The laser 15 may be coupled to the mode filter 19. The laser 15 may be defined by a beam quality $M^2$ factor 16 less than 4, preferably less than 2, and more preferably less than 1.6.

The laser 15 may be a fibre laser, a disk laser, a rod laser, or a solid state laser. The laser 15 may be a master oscillator power amplifier. The laser 15 may be a nanosecond pulsed fibre laser. The nanosecond pulsed fibre laser may be characterized by peak powers in excess of 10 kW. Such lasers require optical isolation at their outputs in order to avoid reflected light distorting the laser output or damaging the laser.

The apparatus may be in the form of an apparatus for the industrial processing of materials. Such an apparatus would include an output optic 17 for focusing laser radiation onto a work piece 18. The output optic 17 may also include an optical scanner.

The apparatus shown with respect to the accompanying Figures is particularly advantageous when converting the output of a laser 15 defined by a lower beam quality $M^2$ factor 16 to a higher beam quality $M^2$ factor 7 that is tailored to a particular industrial application as the optical isolation can be obtained by the same mode conversion process.

It is to be appreciated that the embodiments of the invention described above with reference to the accompanying drawings have been given by way of example only and that modifications and additional components may be provided to enhance performance. Individual components shown in the drawings are not limited to use in their drawings and they may be used in other drawings and in all aspects of the invention. The invention also extends to the individual components mentioned and/or shown above, taken singly or in any combination.

The invention claimed is:

1. Apparatus tor optically isolating a laser from external reflections, which apparatus comprises a mode filter and a first optical fibre, wherein:
   the first optical fibre is a multimode optical fibre that supports a fundamental mode and at least one higher order mode;
   the mode filter is defined by an optical attenuation which Is higher for the higher order mode than for the fundamental mode;
   the mode filter is configured to pass the fundamental mode into the first optical fibre;
   the first optical fibre comprises a long period grating; and
   the long period grating is defined by a period selected to couple the fundamental mode to the higher order mode of the first optical fibre;
and the apparatus being characterized in that:
   the long period grating is a helical long period grating comprising perturbations that describe a helix defined by a screw direction and a period along the axis of the first optical fibre;
   and the period is selected such that the higher order mode is a skew mode whereby if the fundamental mode and the higher order mode are reflected back into the first optical fibre as back-reflected fundamental and higher order modes, then the mode filter optically attenuates the back-reflected higher order mode more than the back-reflected fundamental mode thereby isolating the external reflection.

2. Apparatus according to claim 1 wherein the long period grating comprises the first optical fibre and a bending mechanism configured to perturb the first optical fibre into a helix.

3. Apparatus according to claim 2 wherein the bending mechanism comprises at least one periodic surface.

4. Apparatus according to claim 3 wherein the bending mechanism is configured to squeeze the periodic surface and a length of the first optical fibre together with a squeezing force whereby the amount of coupling between the fundamental mode and the higher order mode Is able to be varied by adjusting the squeezing force.

5. Apparatus according to claim 3 wherein the periodic surface is chirped.

6. Apparatus according to claim 4 wherein the bending mechanism comprises at least two of the periodic surfaces arranged at an angle to each other.

7. Apparatus according to claim 6 wherein the periodic surfaces have the same periodicity.

8. Apparatus according to claim 6 wherein the bending mechanism is such that each periodic surface Is able to be squeezed against the first optical fibre with different squeezing forces.

9. Apparatus according to claim 6 wherein the spatial phases of the periodic surfaces are configured such that the first optical fibre Is deformed substantially in a helical manner when the squeezing forces are applied.

10. Apparatus according to claim 6 wherein the apparatus comprises a plurality of the bending mechanisms.

11. Apparatus according to claim 10 wherein at least one of the bending mechanisms has a different periodicity than another of the bending mechanisms.

12. Apparatus according to claim 6 wherein the bending mechanism includes an actuator.

13. Apparatus according to claim 1 wherein the long period grating comprises perturbations in the form of refractive index variations in the core of the first optical fibre.

14. Apparatus according to claim 1 wherein the mode filter comprises a long period grating configured to couple the back-reflected higher order mode to at least one cladding mode.

15. Apparatus according to claim 1 wherein the mode tilter comprises a second optical fibre in which the higher order mode is not guided by a core of the second optical fibre.

16. A method for optically Isolating a laser from external reflections, which method comprises:
    providing a mode filer and a first optical fibre; and
    coupling the mode filter to the first optical fibre;
    wherein
    the first optical fibre is a multimode optical fibre that supports
    a fundamental mode and at least one higher order mode;
    the mode filter is defined by an optical attenuation which is higher for the higher order mode than for the fundamental mode;
    the mode filter is configured to pass the fundamental mode into the first optical fibre;
    the first optical fibre comprises a long period grating; and
    the long period grating is defined by a period selected to couple the fundamental mode to the higher order mode of the first optical fibre:
    and the method being characterized in that:
    the long period grating is helical long period grating comprising perturbations that describe a helix defined by a screw direction and a period along the axis of the first optical fibre;
    and the period is selected such that the higher order mode is a skew mode whereby if the fundamental mode and the higher order mode are reflected back into the first optical fibre as beck-reflected fundamental and higher order modes, then the mode filter optically attenuates the back-reflected higher order mode more then the back-reflected fundamental mode thereby isolating the external reflection.

* * * * *